(12) United States Patent
Komoda et al.

(10) Patent No.: US 6,263,962 B1
(45) Date of Patent: Jul. 24, 2001

(54) OIL COOLER MOUNTING STRUCTURE

(75) Inventors: Shuji Komoda, Kariya; Shinichi Hamada, Anjo; Yasutoshi Yamanaka, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/437,515

(22) Filed: Nov. 10, 1999

(30) Foreign Application Priority Data

Nov. 13, 1998 (JP) .................................................. 10-323744

(51) Int. Cl.$^7$ ....................................................... F28F 3/00
(52) U.S. Cl. .......................... 165/167; 165/165; 165/916; 123/41.33; 123/196 AB; 184/104.3
(58) Field of Search ..................................... 165/165, 166, 165/167, 51, 916; 228/175, 183; 123/41.33, 196 AB; 184/104.3

(56) References Cited

U.S. PATENT DOCUMENTS

| | | | | |
|---|---|---|---|---|
| 5,291,969 | * | 3/1994 | Diederich, Jr. ..................... | 154/6.22 |
| 5,575,329 | * | 11/1996 | So et al. ............................... | 165/167 |
| 5,746,170 | * | 5/1998 | Moriya .......................... | 123/196 AB |
| 5,787,977 | * | 8/1998 | Yuasa et al. .......................... | 165/165 |

\* cited by examiner

*Primary Examiner*—Ira S. Lazarus
*Assistant Examiner*—Terrell McKinnon
(74) *Attorney, Agent, or Firm*—Harness, Dickey & Pierce, PLC

(57) ABSTRACT

An oil cooler is fixed to an engine via an installation stay provided around an outer periphery of the oil cooler. Thus, the load applied to a core portion is reduced, and the load is dispersed on entire portion of the oil cooler. Thus, the respective stresses applied to respective portions of the oil cooler are very small, and a deformation of the core portion is prevented. Furthermore, since the respective stresses on any portion of the oil cooler is reduced, it is possible to make the oil cooler with aluminum whose strength is lower than that of iron. Furthermore, since the thickness of the installation stay can be reduced, difference in the thermal expansion quantity caused by difference in coefficients of linear expansion of the bolt and the installation stay is significantly reduced, and the loose bolt of the bolt caused by difference in coefficients of linear expansion is prevented.

8 Claims, 9 Drawing Sheets

OIL COOLER MOUNTING STRUCTURE

CROSS-REFERENCE TO RELATED APPLICATION

This application relates to and claims priority from Japanese Patent Application No. Hei. 10-323744 filed on Nov. 13, 1998, the entire contents of which are incorporated herein by reference.

BACKGROUND OF THE INVENTION

1. Field of the Invention

The present invention relates to a mounting structure for an oil cooler which cools engine oil or transmission oil of a vehicle.

2. Related Art

An oil cooler 101, for performing heat exchange between engine cooling water and engine oil, combined with an oil filter 102 for removing a foreign object in engine oil is illustrated in FIG. 9.

The oil cooler 101 has a core portion 101a for heat exchange. A center bolt 103 made of iron penetrates the center of the core portion 101a. By screwing a screw portion 103a formed on an end of the bolt 103 together with an engine block 104, the oil cooler 101 is fixed to the engine block 104 by a flange portion 103b of the bolt 103.

Furthermore, by screwing the oil filter 102 having a filter element 102a together with a screw portion 103c formed on the other end of the bolt 103, the oil filter 102 is combined with the oil cooler 101.

A packing 105 is provided between the oil cooler 101 and the engine block 104. A packing 106 is provided between the oil cooler 101 and the oil filter 102.

As illustrated by arrows in FIG. 9, oil discharged from an oil pump not shown flows to the core portion 101a from a passage 104a of the engine block 104, and is cooled by heat exchange with engine cooling water while passing through the core portion 101a, and flows in the filter element 102a to remove a foreign object, and reaches an oil main gallery (not shown) of the engine via a hole portion 103d formed in the center of the center bolt 103.

In short, the oil cooler 101 is fastened by the center bolt 103 with a very large force because of a reason described hereinafter. The tightening load is concentrated on a central portion of the oil cooler 101. Therefore, a ring-shaped collar 101b is provided in the core portion 101a to bear the load with the collar 101b in order to prevent a deformation of the core portion 101a caused by the tightening load.

The oil cooler 101 has been requested to be made of aluminum because of the lightening request and the like. However, if the oil cooler 101 is made of aluminum, the center bolt 103 made of iron may be loosened because of aluminum fatigue.

Since aluminum is softer than iron, fatigue is likely to occur on the collar 101b which receives the tightening load caused by screwing the center bolt 103. Furthermore, since the coefficient of linear expansion of aluminum is greater than that of iron, fatigue of the collar 101b may also be caused by hot-cold cycle, that is a temperature change caused by ON and OFF of an engine. As a result, the center bolt may be loosened, and the oil cooler 101 may be loosened in the vertical direction in FIG. 9, and the oil may leak at the packing 105 or 106.

According to the oil cooler 101 integrally assembled with the oil filter 102 by the center bolt 103, the center bolt 103 has to be tightened with larger force taking into consideration that the tightening load of the oil cooler 101 decreases as the oil filter 102 is attached and that the bolt 103 should be prevented from being loosened when the oil filter 102 is detached. Accordingly, the fatigue of the collar 101b may likely to be caused, and the bolt may likely to be loosened.

SUMMARY OF THE INVENTION

The present invention is made in light of the foregoing problem, and it is an object of the present invention to provide an oil cooler mounting structure which prevents deformation of a core portion caused by tightening load of a center bolt and which prevents loose bolt.

According to an aspect of the present invention, an oil cooler mounting structure for an oil cooler to be mounted on a mounting member, having a core portion for performing heat exchange between engine cooling water and oil includes an installation stay, having a bolt hole, provided around an outer periphery of the oil cooler for fixing the oil cooler on the mounting member by a bolt, and includes a center bolt penetrating the oil cooler and fixed to the mounting member at a first end of the center bolt, and includes an oil filter fixed to a second end of the center bolt.

Accordingly, the oil cooler is fixed to the mounting member via the installation stay provided around the outer periphery of the oil cooler. Thus, the load applied to the core portion may be only an installation load of the oil filter, or may be only the installation load of the oil filter and an installation load of the oil cooler applied via the installation stay. Since both of the loads are relatively small, and they are dispersed on entire portion of the oil cooler. Thus, the respective stresses applied to respective portions of the oil cooler are very small.

Accordingly, a deformation of the core portion is prevented, and a portion corresponding to the collar of the related art can be thinner and thereby increasing the passage area of the core portion to reduce the pressure loss.

Furthermore, since the respective stresses on any portion of the oil cooler is reduced, it is possible to make the oil cooler with aluminum whose strength is lower than that of iron.

Furthermore, the loose bolt of the bolt is prevented because settling of the installation stay is small even if the oil cooler is made of aluminum. In other words, since the thickness of the installation stay can be reduced significantly compared with the total thickness of the collar of the related art, difference in the thermal expansion quantity caused by difference in coefficients of linear expansion of the bolt and the installation stay is significantly reduced, and the loose bolt of the bolt fixing the oil cooler is prevented.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

The present invention will now be described according to the accompanying drawings.

First Embodiment

Figure 1:
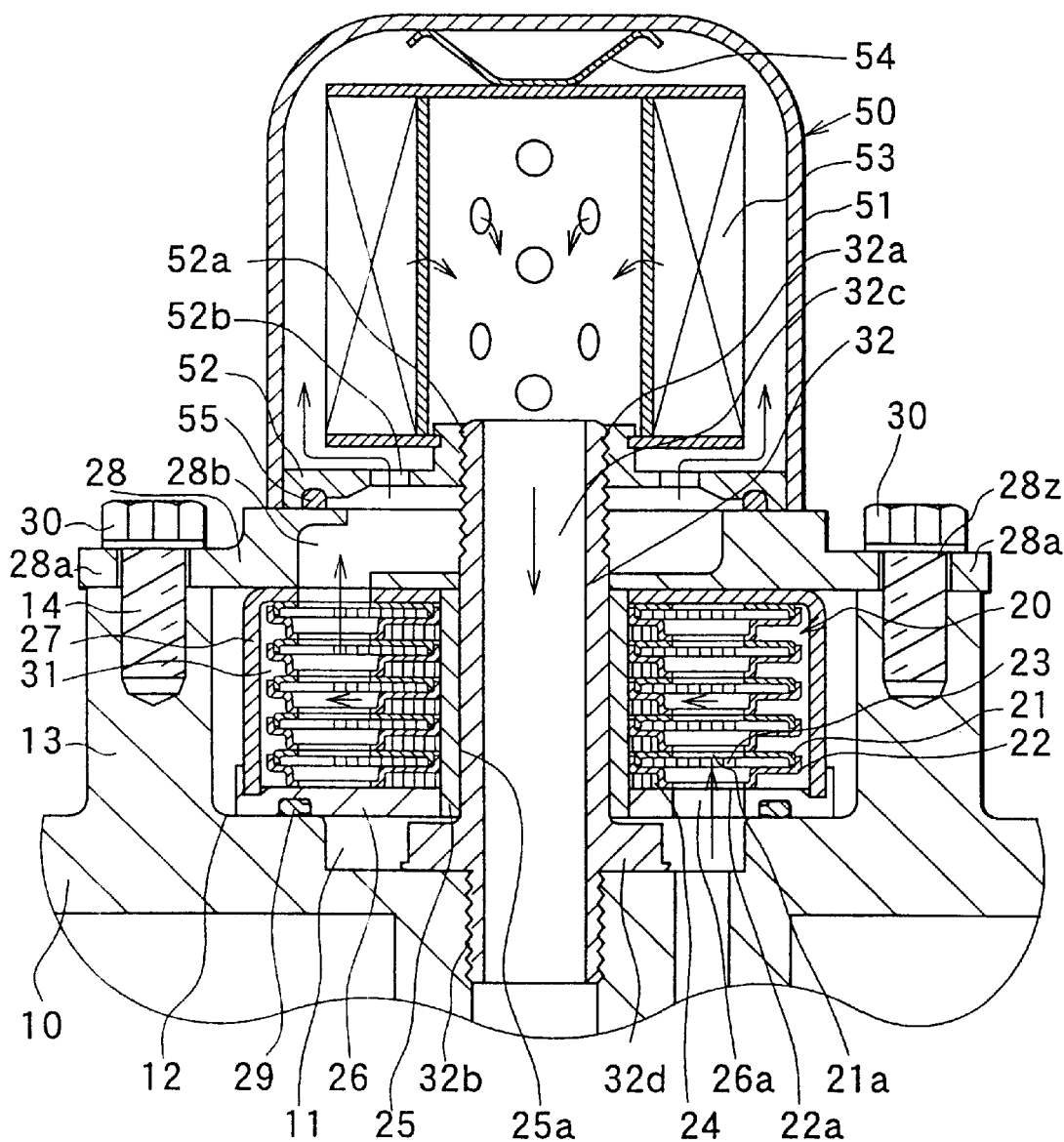
FIG. 1 is a sectional view of an oil cooler according to a first embodiment of the present invention.

FIG. 1 shows a first embodiment applied to an oil cooler which cools an engine oil (hereinafter referred to as the oil) for a vehicle.

A passage 11 is formed in an engine block 10 (installation member) of a water-cooled engine not shown to communicate with a discharge port of an oil pump not shown. The engine block 10 has an installation surface 12 in which the oil cooler is installed. A pair of cylindrical extended portions 13 extending from the installation surface 12 upwardly are formed, and threaded portions 14 are formed on the top of the extended portions 13.

An oil cooler core portion 20 (hereinafter referred to as the core portion) performs a heat exchange between engine cooling water (hereinafter referred to as the cooling water) and the oil. The core portion 20 includes a tube which allows the oil to pass therein and which is formed by brazing accumulated core plates 21 and 22. The two kinds of core plates 21 and 22 are approximately circular, and are formed in a predetermined shape by press molding. Between the core plates 21 and 22, approximately rectangular shaped inner fins 23 and 24 having wave profiles are alternately accumulated and brazed.

The inner fins 23 and 24 are different. The inner fins 23 are located in the tubes. The inner fins 24 are located outside the tubes.

The core plates 21 and 22 have openings 21a and 22a respectively. The openings 21a and 22a allow the oil flow in the core portion 20 in the vertical direction in FIG. 1.

A cylindrical sleeve 25 is located at the inner circumference of the core portion 20. A first plate 26 having a shape of an approximately circular plate is located at the lower end of the core portion 20. The first plate 26 has a hole 26a at its intermediate portion. The sleeve 25 is inserted in the inner circumference of the first plate 26.

A cup-shaped housing 27 having a hole on its center covers the upper end and the outer periphery of the core portion 20. The sleeve 25 is inserted in the inner circumference of the housing 27, and the lower end of the outer circumference of the housing 27 is inserted in the first plate 26.

Furthermore, a second plate 28 having a shape of an approximately circular plate is provided on the housing 27 in FIG. 1. A pair of installation stays 28a are formed on the outer circumference of the second plate 28 such that the installation stays 28a oppose with 180. An oil passage 28b is formed at the inner circumference of the second plate 28.

The installation stays 28a protrude outwardly from the outer circumference of the housing 27, and have respective bolt holes 28z for bolts 30. The installation stays 28a may be a shape of a pair of ears protruding from the center of the second plate 28, or may be formed by forming the bolt holes 28z on a flange-shaped outer circumference of the central thick portion of the second plate 28.

A connecting pipe for connecting a cooling water pipe (not shown) is brazed on the outer periphery of the housing 27 to introduce the cooling water into core space 31 which accommodates the core portion 20.

The sleeve 25, plates 26 and 28, housing 27 and core portion 20 are made of aluminum (for example, A3000 and its family), and a part of them are double-claddings whose both surfaces are covered by a brazing material. The oil cooler is manufactured by brazing those parts accumulated.

The unitarily brazed oil cooler is installed in the engine block 10 by a pair of iron bolts 30 via a packing 29 between the first plate 26 and the installation surface 12. The bolts 30 penetrate the bolt holes 28z of the installation stays 28a, and are screwed with the threaded portion 14 of the extended portion 13.

Before the installation of the oil cooler, an iron-made center bolt 32 is attached to the engine block 10. The center bolt 32 has threaded portions 32a and 32b, a center hole 32c and a flange portion 32d formed on its outer periphery. The threaded portion 32a penetrates the hole 25a of the sleeve 25 and the second plate 28, and protrudes upwardly in FIG. 1 beyond the flange portion 32d.

An oil filter 50 includes a cup-shaped housing 51 and a circular plate 52 connected to an end of the housing 51 to form a housing of the oil filter 50. Inside the housing of the oil filter 50, a cylindrical filter element 53 (hereinafter referred to as the element) for filtering a foreign object in the oil circulating in the engine is provided. A coned disc spring 54 is provided between the element 53 and the housing 51.

A plate 52 has a threaded portion 52a on its center, and has a plurality of holes 52b on its intermediate portion. The oil filter 50 is integrally attached to the oil cooler by screwing the threaded portion 52a of the plate 52 to the threaded portion 32a of the center bolt 32 via a packing 55 between the plate 52 and the second plate 28 of the oil cooler.

An operation of the oil cooler and the oil filter 50 will now be explained briefly.

The oil introduced from the passage 11 of the engine block 10 to the core portion 20 via the hole 26a of the first plate 26 is cooled by the cooling water flows in the core space 31 when the oil passes through the core portion 20.

The heat exchanged oil flows in the oil filter 50 via the passage 28b of the second plate 28 and the hole 52b of the plate 52 of the oil filter 50. Then, a foreign object is removed by the element 53, and the heat exchanged oil reaches the oil main gallery via the hole 32c of the center bolt 32. Then, the oil lubricates respective sliding members, and returns to an oil pan.

A main feature of the first embodiment will now be explained.

Since the oil cooler is fixed to the installation member 10 by the installation stays 28a, an oil cooler installation load and an installation load of the oil filter 50 are applied to the core portion 20 via the installation stays 28a as the bolts 30 are tightened. However, both of the loads are relatively small, and they are received by entire portion of the oil cooler. Thus, the respective stresses applied to respective portions of the oil cooler are very small.

Accordingly, a deformation of the core portion 20 is prevented, and a portion corresponding to the collar 101b of the related art can be thinner and thereby increasing the passage area of the core portion 20 to reduce the pressure loss.

Furthermore, since the respective stresses on any portion of the oil cooler is reduced, it is possible to make the oil cooler with aluminum whose strength is lower than that of iron.

Furthermore, the loose bolt of the bolt 30 is prevented because settling of the installation stay 28a is small even if the oil cooler is made of aluminum. In other words, because a plurality of bolts 30 (in the first embodiment, two bolts 30 are used) are used to fix, the tightening load is dispersed, and the stress at the installation stay 28a becomes smaller, thereby reducing the settling.

Furthermore, since the thickness of the installation stay 28a can be reduced significantly compared with the total thickness of the collar 101b of the related art, difference in the thermal expansion quantity caused by difference in coefficients of linear expansion of the bolt 30 and the installation stay 28a is significantly reduced, and the loose bolt of the bolt 30 fixing the oil cooler is prevented.

Since the installation stay 28a is formed at the other end of the housing 27 (that is, the installation side of the oil filter 50), the oil cooler is fixed at a place close to the center of gravity of the oil cooler. Accordingly, the moment under a vibrational load is reduced, and it is advantageous regarding vibration resistance.

Furthermore, since the extended portion 13 outwardly extending from the installation surface 12 of the engine block 10 is formed and the threaded portion 14 is formed on the extended portion 13, the threaded portion 14 does not protrude in the engine block 10. Accordingly, the inner space of the engine block 10 is effectively utilized.

The tightening load of the bolt 30 and the installation load of the oil filter 50 are applied to the outer circumference or entire portion of the oil cooler. However, the circumferential length of the outer circumference is greater than that of the inner circumference. Accordingly, the area for receiving the load is secured, and the deformation is prevented without substantially increasing the thickness of the housing 27.

According to the above described related art, the center bolt 103 is tightened with extra strength (larger force) taking into consideration that the tightening load of the oil cooler 101 decreases as the oil filter 102 is attached and that the bolt 103 should be prevented from being loosened when the oil filter 102 is detached.

According to the first embodiment of the present invention, however, such extra strength of the tightening force for compensating the tightening load decrease and for preventing the loose bolt is not necessary, and the load applied to the housing 27 is decreased, and securing the strength of the housing 27 is facilitated.

Furthermore, since the oil cooler is fixed by a plurality of bolts 30, the oil cooler is prevented from being rotated.

In order to seal between the center bolt 32 and the sleeve 25, a packing may be provided between the center bolt 32 and the sleeve 25, or between the first plate 26 and the flange portion 32d. Furthermore, the number of the bolts 30 and the installation stays 28a may be increased if necessary.

Further, the present invention is applicable not only to an oil cooler made of aluminum, but also to an oil cooler made of iron.

Second Embodiment

Figure 2:
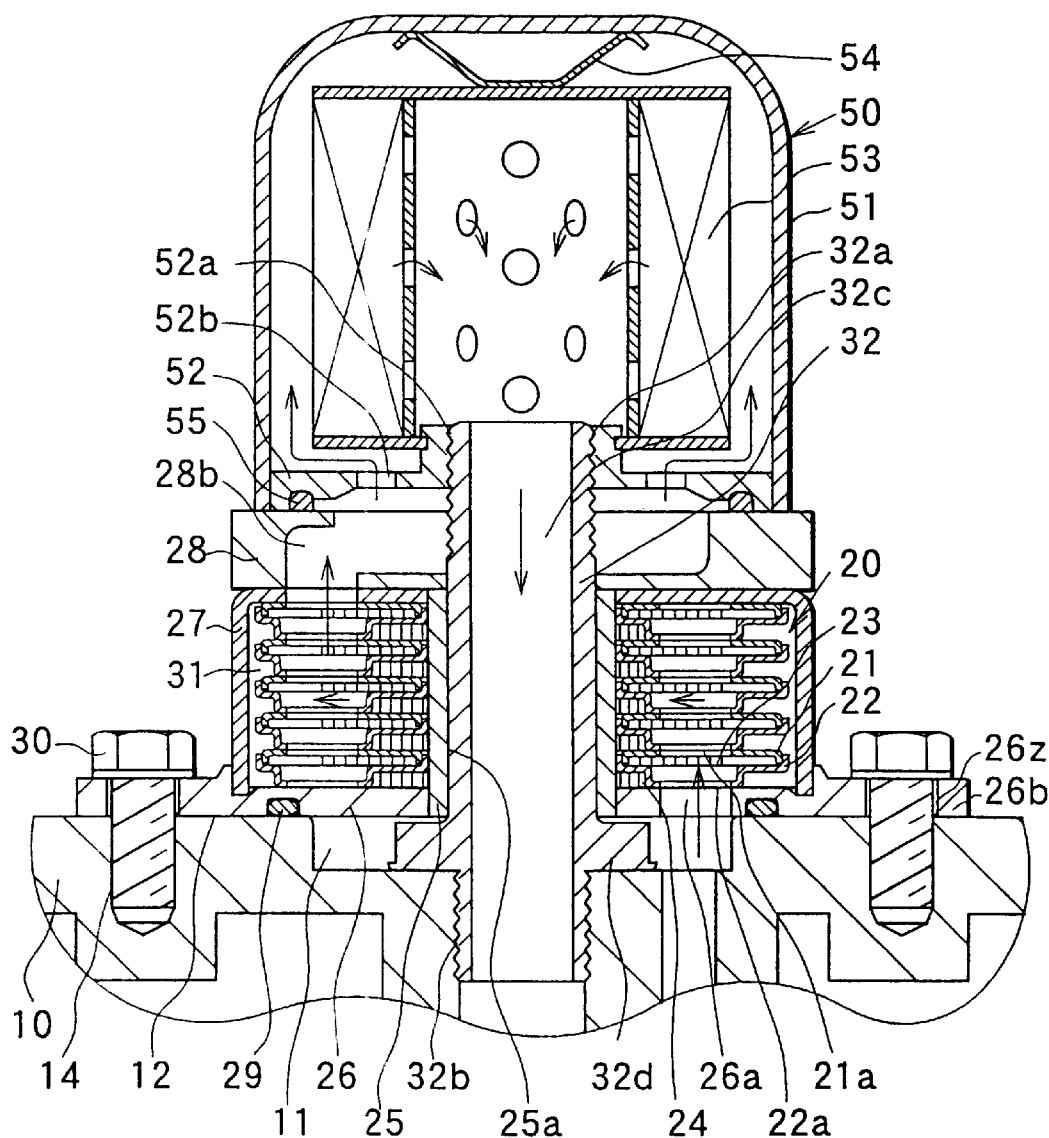
FIG. 2 is a sectional view of an oil cooler according to a second embodiment of the present invention.

A second embodiment of the present invention is illustrated in FIG. 2. In this and the following embodiments, components which are substantially the same to those in the first embodiment are assigned the same reference numerals.

Although the installation stays 28a are formed on the second plate 28 according to the first embodiment, a pair of installation stays 26b each having a bolt hole 26z are formed on an outer periphery of the first plate 26 according to the second embodiment instead.

According to the second embodiment, there is an advantage that the extended portion 13 of the engine block 10 is obviated.

Furthermore, only the installation load of the oil filter 50 is applied to the oil cooler, and no tightening load of the bolt 30 is applied to the oil cooler. Accordingly, preventing the deformation of the oil cooler is further secure.

Third Embodiment

Figure 3:
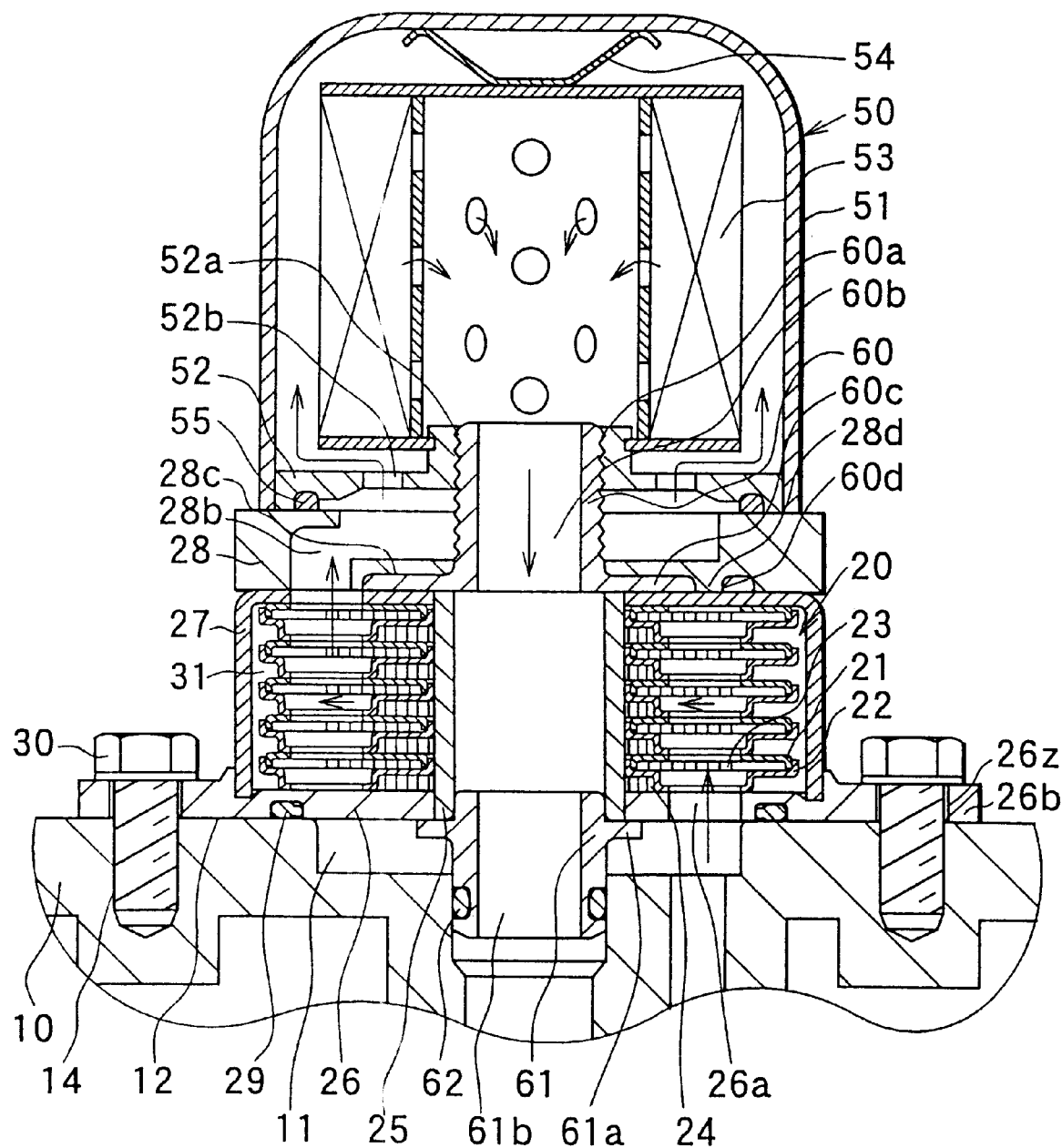
FIG. 3 is a sectional view of an oil cooler according to a third embodiment of the present invention.

A third embodiment of the present invention is illustrated in FIG. 3. In the third embodiment, the second plate 28 and the center bolt 32 in the second embodiment are modified.

As shown in FIG. 3, a center bolt 60 made of iron has a threaded portion 60a and a hole 60b, and further has a flange portion 60c at its lower end. A plurality of through holes 60d are formed on the flange portion 60c. A concave portion 28c in which the flange portion 60c is embedded and a plurality of convex portions 28d which are inserted in the through holes 60d are formed on the second plate 28.

When a laminated oil cooler is brazed, the bolt 60 is unified with the oil cooler by being sandwiched between the housing 27 and the second plate 28, because the bolt 60 has been installed in a position illustrated in FIG. 3. The lower end surface of the convex portion 28d is also brazed with the housing 27.

A pipe 61 made of aluminum having a flange portion 61a and a hole 61b is brazed with or pressed in the lower end of the sleeve 25. Further, an O-ring 62 seals between the pipe 61 and the engine block 10.

According to the third embodiment, the tightening load, caused by screwing the oil filter 50 on the threaded portion 60a of the center bolt 60, is applied only to the second plate 28, and is not applied to the housing 27 and the core portion 20. Thus, it is advantageous to prevent the deformation of the housing 27 or the core portion 20.

Furthermore, because the thickness of the second plate 28 is extremely thinner than that (vertical height in FIG. 3) of the core portion 20, difference in thermal expansion quantity between the bolt 60 and the second plate 28 is also small.

Furthermore, since the bolt 60 is unified with the oil cooler, the number of the assembling processes to the engine decreases. Further, the convex portions 28d prevent the bolt 60 from rotating.

Fourth Embodiment

Figure 4:
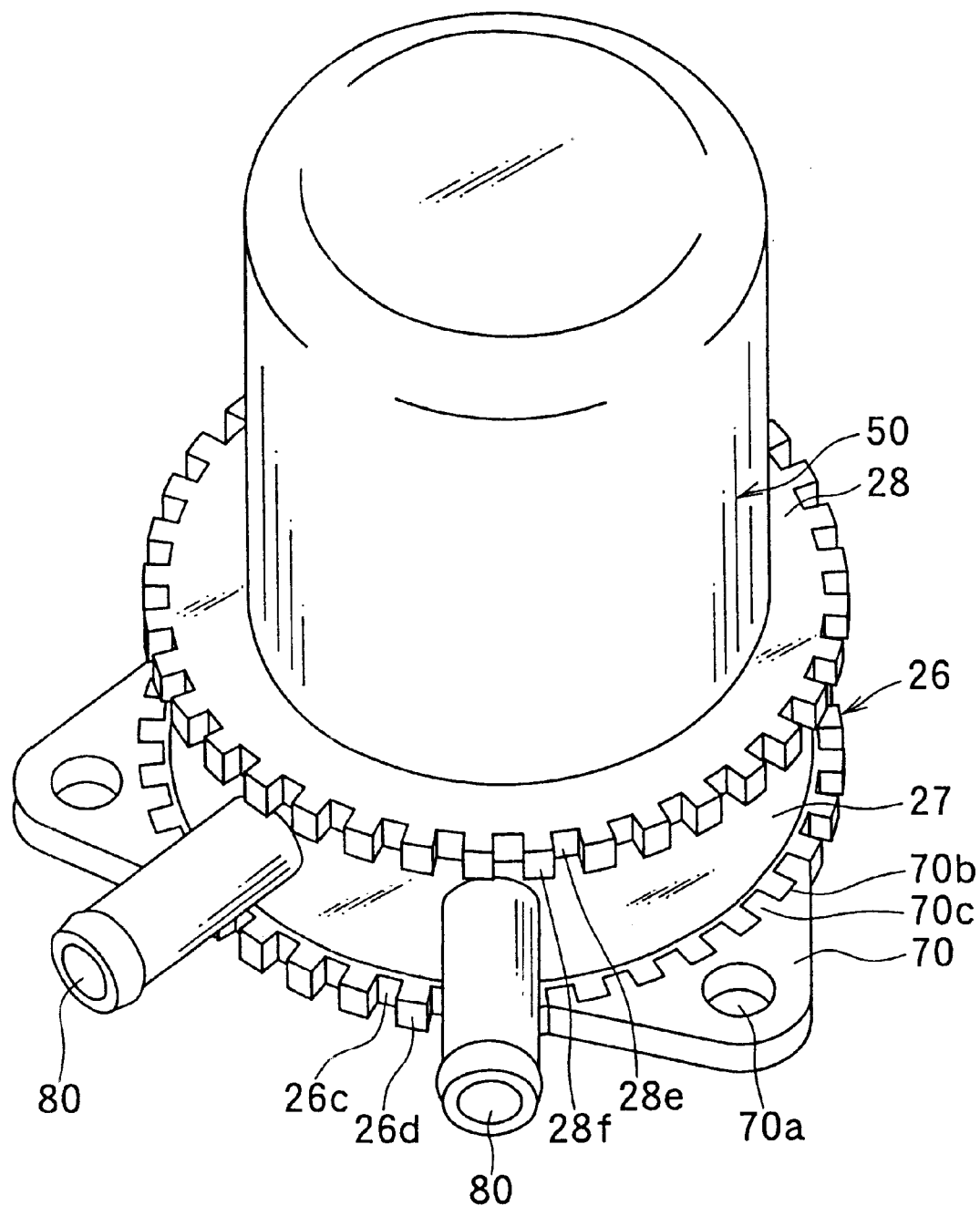
FIG. 4 is a perspective view of an oil cooler according to a fourth embodiment of the present invention.

A fourth embodiment of the present invention is illustrated in FIG. 4. In the fourth embodiment, an installation stay 70 is a separated body to cope easily with a design change of the location of the threaded portion 14 of the engine block 10.

As shown in FIG. 4, tooth-profiled concaves 26c and convexes 26d are alternately and continuously formed on an entire periphery of the first plate 26. Further, several tooth-profiled concaves 70b and convexes 70c are formed on the installation stay 70 made of aluminum. After joining the concaves 70b and convexes 70c of the installation stay 70 together with the concaves 26c and convexes 26d of the first plate 26, the first plate 26 and the installation stay 70 are brazed.

Accordingly, differences of the circumferential position of the threaded portion of the engine block for different engines are compensated by changing the matching position of the installation stay 70 with the first plate 26 in the circumferential direction to the most suitable position for an engine.

Further, the position of a bolt hole 70a may be changed according to a positional difference in the radial direction of the threaded portion of the engine block.

Furthermore, similarly to the first plate 26, tooth-profiled concaves 28e and convexes 28f are alternately and continuously formed on an entire periphery of the second plate 28. When the extended portion 13 described in the first embodiment is formed, after joining the concaves 70b and convexes 70c of the installation stay 70 together with the concaves 28e and convexes 28f of the second plate 28, the second plate 28 and the installation stay 70 are brazed.

A connecting pipe 80 made of aluminum for connecting a cooling water pipe (not shown) is brazed with the housing 27.

According to the fourth embodiment, the installation stay 70 is a separated body. Thus, even if the bolt installation positions vary according to respective vehicles, such positional difference is coped with by replacing the installation stay 70 or by changing the installation position of the installation stay 70 in the circumferential direction with respect to the plates 26 and 28. Accordingly, all parts except the installation stay 70 can be used for any vehicle. Thus, it is facilitated to cope with multi-item production, and there is an advantage as to cost reduction.

Furthermore, respective concaves and convexes 26c, 26d, 28e, 28f, 70b and 70c facilitate the positioning of the installation stay 70 with respect to the plates 26 and 28.

Since the installation stay 70 is a separated body, the settling caused by the tightening load is reduced if the installation stay 70 is made of aluminum having high strength, such as A7000 or its family.

Fifth Embodiment

Figure 5:
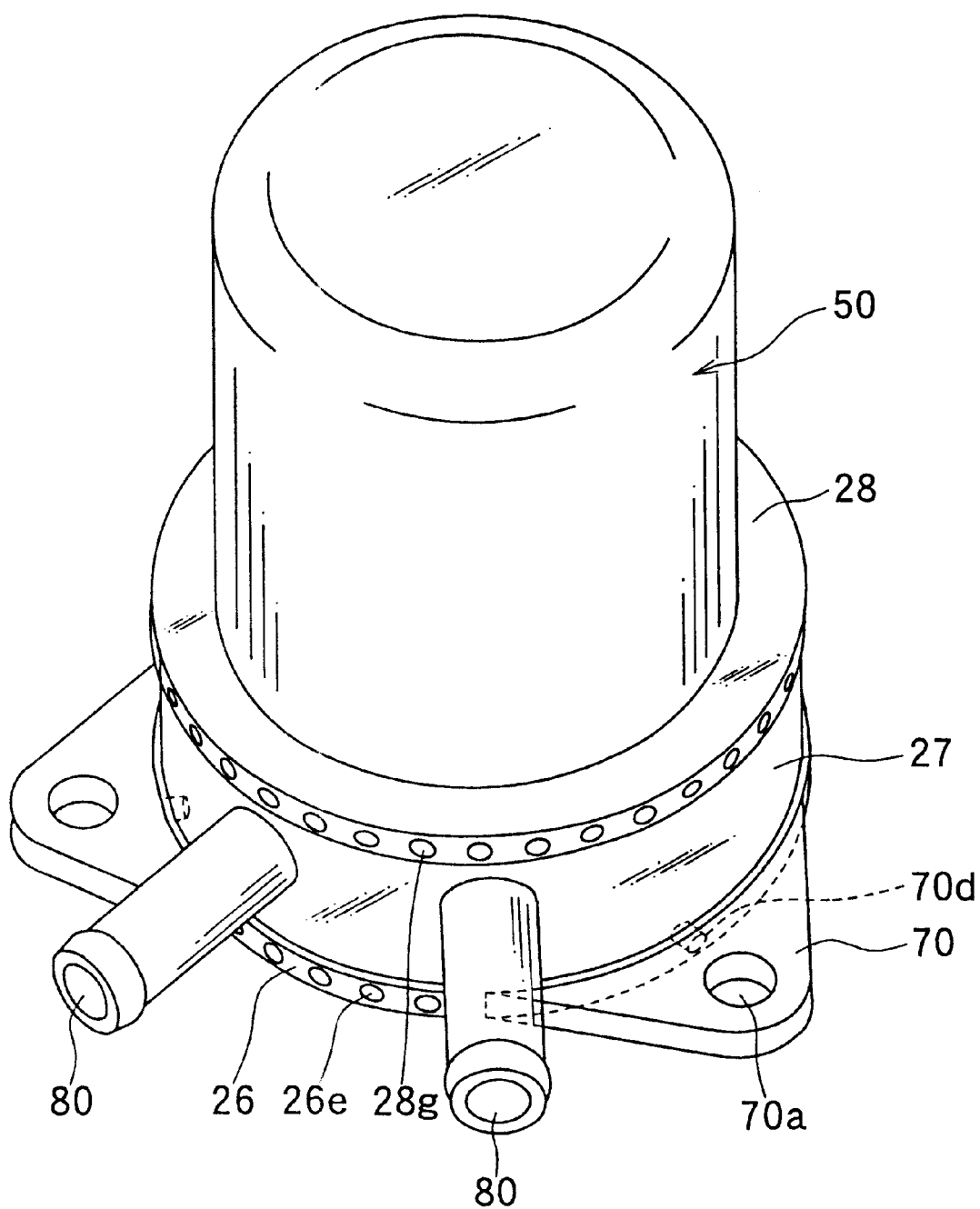
FIG. 5 is a perspective view of an oil cooler according to a fifth embodiment of the present invention.
Figure 6A:
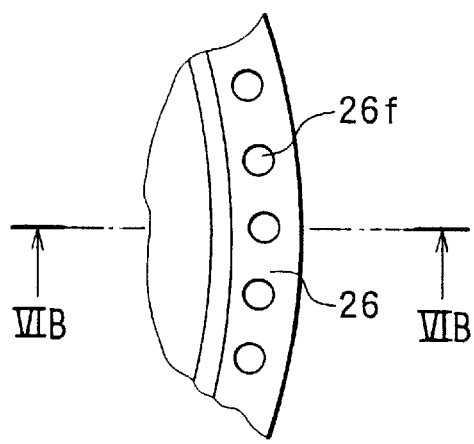
FIG. 6A is a part of a plan view of a plate according to a sixth embodiment of the present invention.
Figure 6C:
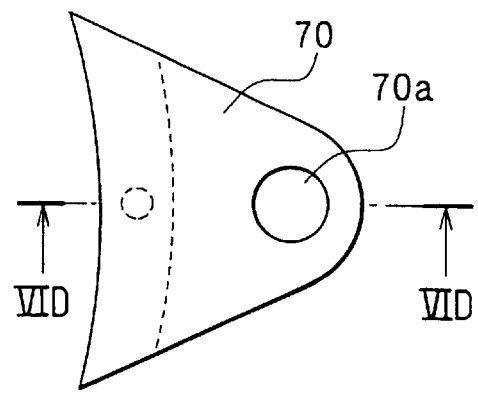
FIG. 6C is a plan view of an installation stay according to the sixth embodiment of the present invention.
Figure 6B:
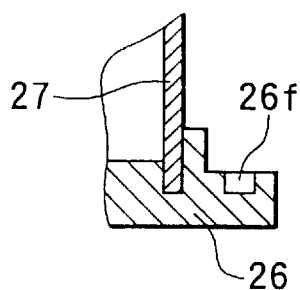
FIG. 6B is a part of a sectional view taken along line VI$_B$—VI$_B$ in FIG. 6A.
Figure 6D:
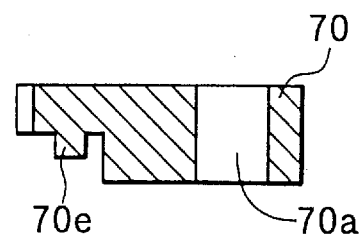
FIG. 6D is a sectional view taken along line VI$_D$—VI$_D$ in FIG. 6C.
Figure 7A:
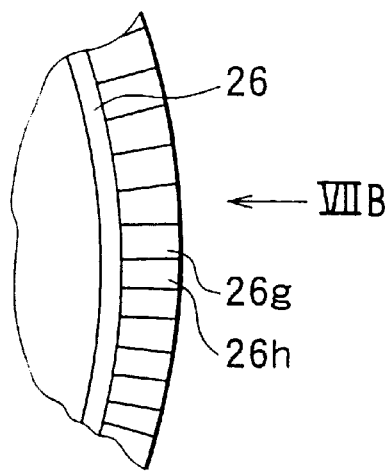
FIG. 7A is a part of a plan view of a plate according to a seventh embodiment of the present invention.
Figure 7C:
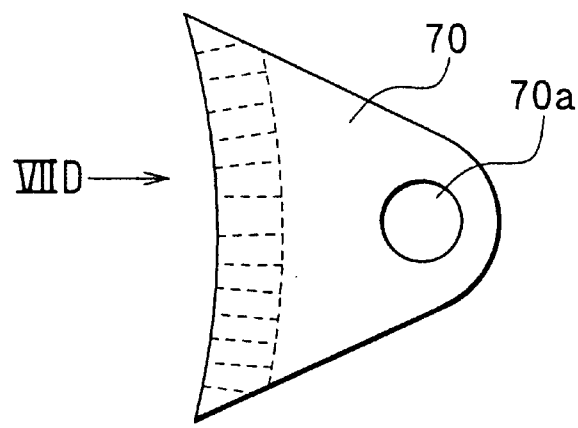
FIG. 7C is a plan view of an installation stay according to the seventh embodiment of the present invention.
Figure 7B:
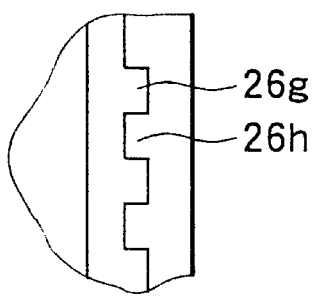
FIG. 7B is a part of a side view of the plate viewed from a direction of an arrow VII$_B$ in FIG. 7A.
Figure 7D:
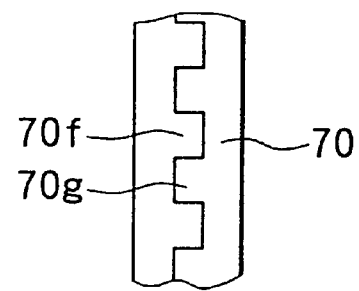
FIG. 7D is a side view of the installation stay viewed from a direction of an arrow VII$_D$ in FIG. 7C.
Figure 8A:
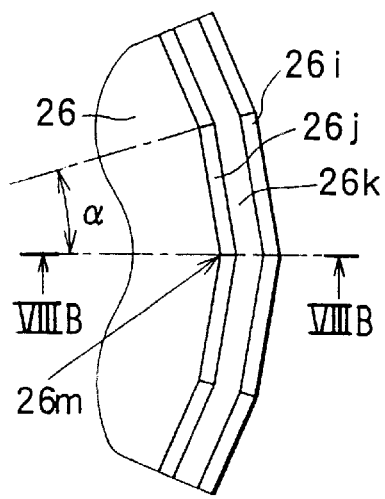
FIG. 8A is a part of a plan view of a plate according to an eighth embodiment of the present invention.
Figure 8C:
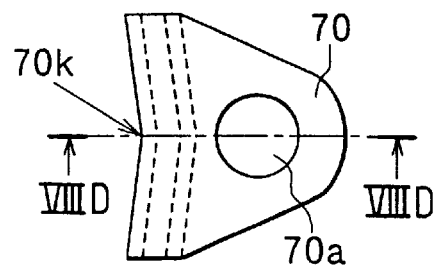
FIG. 8C is a plan view of an installation stay according to the eighth embodiment of the present invention.
Figure 8B:
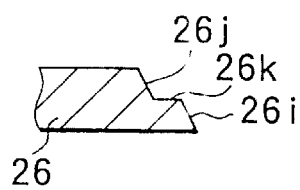
FIG. 8B is a part of a sectional view taken along line VIII$_B$—VIII$_B$ in FIG. 8A.
Figure 8D:
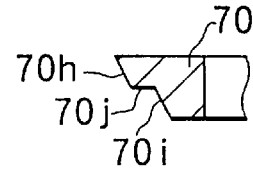
FIG. 8D is a sectional view taken along line VIII$_D$—VIII$_D$ in FIG. 8C.
Figure 8E:
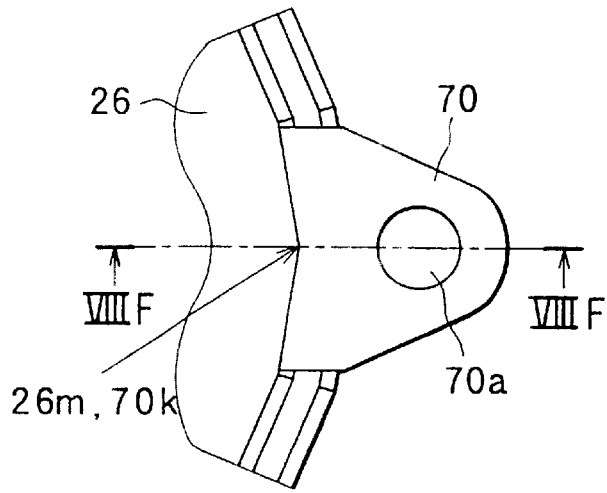
FIG. 8E is a plan view showing an assembled state between the plate and the installation stay according to the eighth embodiment of the present invention.
Figure 8F:
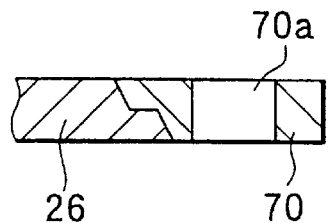
FIG. 8F is a sectional view taken along line VIII$_F$—VIII$_F$ in FIG. 8E.
Figure 9:
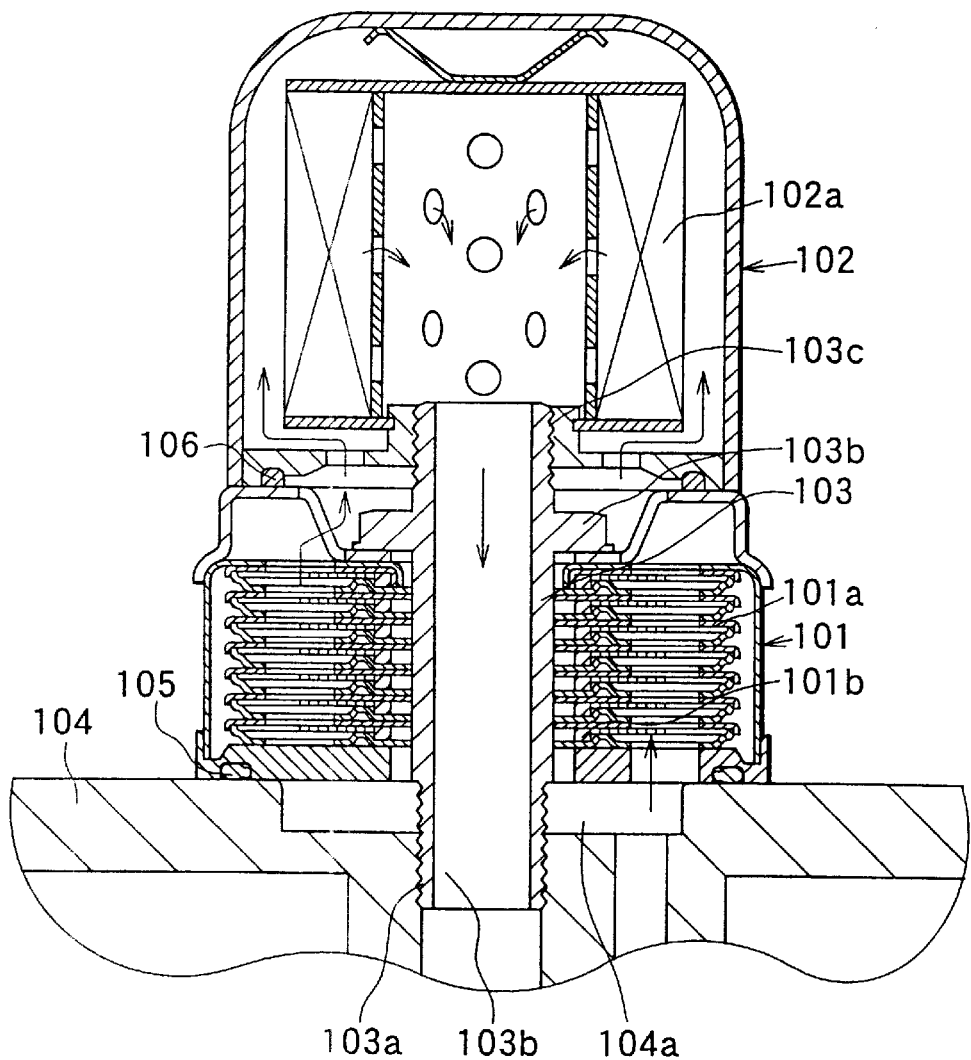
FIG. 9 is a sectional view of an oil cooler according to a related art.

A fifth embodiment of the present invention is illustrated in FIG. 5. The fifth embodiment is a modification of the fourth embodiment having a matching structure using the concaves and convexes 26c, 26d, 28e, 28f, 70b and 70c.

In the fifth embodiment, circular holes 26e and 28g are formed on entire periphery of respective plates 26 and 28. Cylindrical convexes 70d which fit the holes 26e and 28g are formed on the installation stay 70. After joining the convexes 70d of the installation stay 70 with certain holes 26e and 28g at a predetermined position, they are brazed together.

Sixth Embodiment

A sixth embodiment of the present invention is illustrated in FIG. 6. The sixth embodiment is a modification of the fifth embodiment having another matching structure.

In the sixth embodiment, circular holes 26f are formed on an entire outer circumferential surface of the first plate 26 opposite to a surface contacting the engine block. Cylindrical convexes 70e, which fit in the holes 26f, are formed on the installation stay 70. After joining the convexes 70e of the installation stay 70 with the holes 26f of the plate 26 at a predetermined position, they are brazed together.

Seventh Embodiment

A seventh embodiment of the present invention is illustrated in FIG. 7. The seventh embodiment is a modification of the sixth embodiment having another matching structure.

In the seventh embodiment, tooth-profiled concaves 26h and convexes 26g are alternately and continuously formed on an entire periphery of the first plate 26 opposite to the surface contacting the engine block. Further, several tooth-profiled concaves 70f and convexes 70g are formed on the installation stay 70. After joining the concaves 70f and convexes 70g of the installation stay 70 with the concaves 26h and convexes 26g of the first plate 26, the first plate 26 and the installation stay 70 are brazed together.

Eighth Embodiment

An eighth embodiment of the present invention is illustrated in FIG. 8. The eighth embodiment is a modification of the fourth to seventh embodiments having another matching structure.

In the eighth embodiment, slant faces 26i and 26j and an intermediate face 26k therebetween are formed on the outer periphery of the first plate 26. The slant faces 26i, 26j and the intermediate face 26k are straight in the circumferential direction within a predetermined angle β. Accordingly, the outer circumference of the first plate 26 has a polygonal shape.

On the other hand, slant faces 70h and 70i and an intermediate face 70j to be matched with the faces 26i, 26j and 26k of the first plate 26 are formed on the installation stay 70.

After lapping the installation stay 70 over the first plate 26 such that an apex 26m of the polygonal first plate 26 matches with a bending point 70k of the installation stay 70, the first plate 26 and the installation stay 70 are brazed together.

Other Modifications

In the above described embodiments, the oil cooler for cooling the engine oil of the vehicle has been described. However, the present invention is applicable to an oil cooler which cools a transmission oil.

Furthermore, in the above described embodiments, the oil cooler is the one in which the cooling water passes through the core space 31. However, the present invention is also applicable to an oil cooler having alternately piled oil passages and cooling water passages in a core portion formed by piling core plates. In this case, the housing 27 is obviated because the core space 31 as a cooling water passage is unnecessary.

Further, according to the above described embodiments, the installation stay is located at one end (the engine block side or the oil filter side) of the oil cooler. However, the installation stay may be placed at an intermediate position of the oil cooler in a vertical direction.

Furthermore, the present invention may be applicable to an oil cooler which does not have the filter 50.

Furthermore, the oil cooler may be mounted on an automatic transmission instead of the engine block.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An oil cooler mounting structure for an oil cooler to be mounted on a mounting member, having a core portion for performing heat exchange between engine cooling water and oil, comprising:
   an installation stay, having a bolt hole, provided around an outer periphery of the oil cooler for fixing the oil cooler on the mounting member by a bolt;
   a center bolt penetrating the oil cooler and fixed to the mounting member at a first end of said center bolt; and
   an oil filter fixed to a second end of said center bolt, wherein;
      the oil cooler has a first end disposed on a mounting surface of the mounting member and has a second end having a plate; and
      said installation stay is unitarily formed with said plate.

2. An oil cooler mounting structure as in claim 1, wherein the oil cooler is made of aluminum.

3. An oil cooler mounting structure as in claim 1, wherein;
   an extended portion, extended from said mounting surface of the mounting member toward said second end of the oil cooler, is provided on the mounting member; and
   said installation stay provided on the oil cooler is screwed on an end surface of said extended portion.

4. An oil cooler mounting structure for an oil cooler to be mounted on a mounting member, having a core portion for performing heat exchange between engine cooling water and oil, comprising:
   an installation stay, having a bolt hole, provided around an outer periphery of the oil cooler for fixing the oil cooler on the mounting member by a bolt;
   a center bolt penetrating the oil cooler and fixed to the mounting member at a first end of said center bolt; and
   an oil filter fixed to a second end of said center bolt, wherein;
      an extended portion extended from a mounting surface of the mounting member to the oil cooler is provided on the mounting member; and
      said installation stay provided on the oil cooler is screwed on an end surface of said extended portion.

5. An oil cooler mounting structure for an oil cooler to be mounted on a mounting member, having a core portion for performing heat exchange between engine cooling water and oil, comprising:
   an installation stay, having a bolt hole, provided around an outer periphery of the oil cooler for fixing the oil cooler on the mounting member by a bolt;
   a center bolt penetrating the oil cooler and fixed to the mounting member at a first end of said center bolt; and
   an oil filter fixed to a second end of said center bolt, wherein;
      said installation stay is separately formed from the oil cooler; and
      the oil cooler and said installation stay have a positioning member for positioning said installation stay at a predetermined position with respect to the outer periphery of the oil cooler.

6. An apparatus for mounting an oil cooler to an engine block, comprising:
   a mounting plate disposed on the engine block around a periphery of the oil cooler, and having a securing member bore aligned with a corresponding securing member bore in the engine block;
   a fixing member, engaging with said securing member bore in the engine block through said securing member bore of said mounting plate, for fixing said mounting plate and the oil cooler to the engine block;
   a center bolt penetrating the oil cooler and fixed to the engine block at a first end of said center bolt; and
   an oil filter fixed to a second end of said center bolt, said mounting plate is separately formed from the oil cooler; and
   the oil cooler and said mounting plate have a positioning member for positioning said mounting plate at a predetermined position with respect to the outer periphery of the oil cooler.

7. An oil cooler to be mounted on an engine, comprising:
   an installation stay disposed on the engine around an outer periphery of the oil cooler for fixing the oil cooler on the engine by a bolt;
   a center bolt securing the oil cooler to the engine at a center of the oil cooler and at a first end of said center bolt; and
   an oil filter fixed to a second end of said center bolt, wherein;
      said installation stay is separately formed from the oil cooler; and
      the oil cooler and said installation stay have respective positioning members for positioning said installation stay at a predetermined position with respect to the outer periphery of the oil cooler.

8. An oil cooler mounting structure for an oil cooler to be mounted on a mounting member, having a core portion for performing heat exchange between engine cooling water and oil, comprising:
   an installation stay, having a bolt hole, provided around an outer periphery of the oil cooler for fixing the oil cooler on the mounting member by a bolt;
   a center bolt having a first end and a second end, said second end of said center bolt having a flange on a periphery thereof;
   a plate mounted on the core portion; and
   an oil filter fixed on said plate by screwing said oil filter on said first end of said center bolt, wherein;
      said flange of said center bolt is sandwiched between said plate and the core portion; and
      said plate and the core portion is fixed by brazing.

* * * * *